US006643372B2

(12) United States Patent
Ford et al.

(10) Patent No.: US 6,643,372 B2
(45) Date of Patent: Nov. 4, 2003

(54) APPARATUS AND METHOD FOR MUSIC PRODUCTION BY AT LEAST TWO REMOTELY LOCATED MUSIC SOURCES

(76) Inventors: Dennis L. Ford, 2135 N. Ivar Ave., #7, Los Angeles, CA (US) 90068; Michael R. Leggett, 410 Victory Garden Dr., #8, Tallahassee, FL (US) 32301; Cindy K. Leggett-Ford, 1825 N. Cahuenga, #302, Los Angeles, CA (US) 90028

( * ) Notice: Subject to any disclaimer, the term of this patent is extended or adjusted under 35 U.S.C. 154(b) by 0 days.

(21) Appl. No.: 10/336,382

(22) Filed: Jan. 2, 2003

(65) Prior Publication Data

US 2003/0099347 A1 May 29, 2003

Related U.S. Application Data

(63) Continuation-in-part of application No. 09/520,536, filed on Mar. 8, 2000, now abandoned.

(51) Int. Cl.[7] .................................................. H04M 1/00
(52) U.S. Cl. .............................. 379/388.02; 379/101.01
(58) Field of Search ........................ 379/101.01, 388.02, 379/388.05, 390.01, 390.02, 395.01; 370/295; 331/16, 25, 57

(56) References Cited

U.S. PATENT DOCUMENTS 4,130,734 A 12/1978 Lee
4,644,526 A * 2/1987 Wu ............................ 370/295
4,922,536 A 5/1990 Hoque
5,020,101 A 5/1991 Brotz et al.
5,182,769 A 1/1993 Yamaguchi et al.
5,398,278 A 3/1995 Brotz
5,572,561 A 11/1996 Usami et al.
5,587,673 A 12/1996 MacDonald
5,680,067 A 10/1997 Marchand
5,703,509 A 12/1997 Hirata
5,789,985 A * 8/1998 Yamauchi et al. .......... 331/1 A
5,914,620 A 6/1999 Simons et al.
5,999,618 A 12/1999 Reichard et al.

OTHER PUBLICATIONS

McClellan, "Test Equipment For Audio Technicians: Balanced–Line Converter," Electronics Now, p. 41–44, (Dec. 2, 1999).
Szabo, "Audio Level Controller," Electronics Now, p. 41–44, (Feb. 2, 1993).
Burr–Brown Corporation, "Multiplier–Divider," Burr–Brown Corporation (Tucson, AZ), p. 12, (Jan. 2, 1987).

(List continued on next page.)

*Primary Examiner*—Forester W. Isen
*Assistant Examiner*—Jefferey Harold
(74) *Attorney, Agent, or Firm*—Gene Scott-Patent Law & Venture Group

(57) ABSTRACT

An apparatus and method for joint music production wherein a remotely separated plurality of musicians are joined by phone lines of a public telephone system. The public telephone system has a signal frequency cutoff limiting transmission to a low range which is incompatible with music. Each of musicians produces a local music signal ($MS_L$) with full audio range. This signal is impressed on the public telephone system which creates a low-end outbound music signal ($LE_L$). Also, separately, the $MS_L$ signal is filtered through a first high-pass filter and mixed with a mixer signal to produce a sum/difference signal ($SD_L$). The $SD_L$ signal is impressed onto the second phone line of the public telephone system as a high-end outbound music signal ($HE_L$). A second mixer circuit receives at least one remotely produced sum/difference signal ($SD_R$) and the mixer signal and this is again filtered to obtain the high end signal only ($HE_R$). The $HE_R$ signal and the at least one remotely produced low-end signal ($LE_R$) are joined to produce the remotely originated limited band pass music signal which is summed with the $MS_R$ signal for listening to the composite music signal.

6 Claims, 2 Drawing Sheets

OTHER PUBLICATIONS

Burr–Brown Corporation, “Wide–Bandwidth Signal Multiplier,” Burr–Brown Corporation (Tucscon, AZ), p. 12, (Jan. 2, 1989).

Burr–Brown Corporation, “Voltage–To–Frequency and Frequency–to–Voltage Converter,” Burr–Brown Corporation (Tucson, AZ), p. 9, (Jan. 2, 1982).

Burr–Brown Corporation, “Wide Bandwidth Precision Analog Multiplier,” Burr–Brown Corporation (Tucson, AZ), p. 11, (Jan. 2, 1985).

Cypress Semiconductor Corporation, “Frequency Multiplier and Zero Delay Buffer,” Cypress Semiconductor Corporation (San Jose, CA), p. 8, (Jan. 5, 2000).

* cited by examiner

APPARATUS AND METHOD FOR MUSIC PRODUCTION BY AT LEAST TWO REMOTELY LOCATED MUSIC SOURCES

RELATED APPLICATIONS

This is a continuation-in-part application of a prior filed application having Ser. No. 09/520,536 and filing date of Mar. 8, 2000 ABN.

INCORPORATION BY REFERENCE: Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to an apparatus and method for music production by at least two remotely located musicians, and more particularly to a stereo telephone device providing an interactive audio mixing board and expandable bandwidth.

2. Description of Related Art

The following art defines the present state of this field:

Lee, U.S. Pat. No. 4,130,734 describes an analog bandwidth compressor of the present system preserves the actual frequencies of the detected signal. This is accomplished by feeding the detected signal to a bank of contiguous filters and feeding the outputs of each of these filters to an AM detector and a frequency divider. The output from each frequency divider is fed to a tunable filter bank. The outputs of the tunable filter bank are fed to multipliers where the outputs from the associated AM detectors are superimposed on the frequency signals from the tunable filter bank. The output of the plurality of multipliers is fed to a summing network which provides a reduced bandwidth signal. The output of the summing network is subsequently fed through a transmission system to a bandwidth restoration circuit which consists of a tunable contiguous filter bank, AM detector, frequency multiplier, tunable filter bank, multipliers and a summer similar to the bandwidth reduction circuit.

Hoque et al, U.S. Pat. No. 4,922,536 describes in-studio, stage or field applications, high fidelity audio signals are transmitted to a remote processor in digital form in order to solve the problems of audio degradation, cross talk, ground loops and multi-cable problems associated with the analog transmission of multiple channels of audio over long distances. In one embodiment a TDM/FDM multiplexing system is utilized with increased bandwidth and dynamic range compared to data and telephone multiplexing systems to accommodate high fidelity requirements. In an embodiment involving a distributed system, multiple MUX and DEMUX modules are coupled in a distributive fashion along a lightweight transmission line, in which each of the modules is assigned a predetermined transmission frequency and with each of the modules having a number of audio inputs which are time-multiplexed for that particular MUX module and frequency. The Subject System precludes the necessity of running multiple audio cables to remote destinations, while at the same time providing an exceptionally quiet system, since the digital data stream is extremely tolerant to cross talk, ground loops, noise, signal attenuation, and nonlinearity associated with conventional analog audio transmission.

Brotz et al, U.S. Pat. No. 5,020,101 describes a musician's telephone interface that interconnects an instant location through a telephone line to a remote location such device having inputs to receive the sound from musical instruments and/or vocalization at each location with balancing circuitry and broadcast means at each location for the musicians at each location to hear the music of one another simultaneously balanced for collaboration and production of music.

Nakano et al, U.S. Pat. No. 5,182,768 describes a digital telephone set connected to a digital data exchange through a transmission line. A plurality of handsets, which are mounted on a telephone body, are for converting input sounds into input analog speech signals and for converting output analog speech signals into output sounds. Connected to the handsets, a plurality of analog-to-digital converters converts the input analog speech signals into input digital speech signals. Connected to the handsets, a plurality of digital-to-analog converters converts output digital speech signals into the output analog speech signals. On the telephone body are mounted a set of dialing keys for producing a numerical signal. Connected to the dialing keys, a control device is for producing input control data in response to the numerical signal and is for producing an output control signal in response to output control data. Connected to the transmission line, the control device, the analog-to-digital converters, and the digital-to-analog converters, a multiplexing/demultiplexing circuit is for transmitting/receiving transmission/reception time division multiplexed signals to/from the digital data exchange through the transmission line. The multiplexing/demultiplexing circuit is for multiplexing the input digital speech signals and the input control data into the transmission time division multiplexed signal and for demultiplexing the reception time division multiplexed signal into the output digital speech signals and the output control data.

Brotz et al, U.S. Pat. No. 5,398,278 describes a telephone interface system to interconnect the output of two or more musicians, one at an instant location and the other at a remote location, over communication lines, such system converting the analog musical output to digital form for duplexing over the communication lines.

Usami, U.S. Pat. No. 5,572,561 teaches a frequency dividing circuit including a first inverter circuit supplied with a first frequency-divided signal, a second inverter circuit supplied with a second frequency-divided signal which has a complementary relationship to the first frequency-divided signal, and a first pair of push-pull circuits. There are also provided a first switch circuit performing a first switching operation in response to a first input signal and selectively supplying output signals of the first and second inverter circuits to the first pair of push-pull circuits so that one of the first pair of push-pull circuits performs a pull-up operation when the other one thereof performs a pull-down operation. Further, there are provided a second pair of push-pull circuits, and a second switch circuit performing a second switching operation in response to a second input signal which has a complementary relationship to the first input signal and selectively supplying output signals of the first pair of push-pull circuits to the second pair of push-pull circuits so that one of the second pair of push-pull circuits performs a pull-up operation when the other one thereof performs a pull-down operation. The first and second frequency-divided signals are output from the second pair of push-pull circuits.

MacDonald, U.S. Pat. No. 5,587,673 teaches a circuit (10) for generating an output signal having a frequency that is a multiple of an input clock signal (CLKIN). The circuit includes a delay circuit (12) having an input port and a plurality of output ports (A, B, C). The input port is coupled during use to the input clock signal. Individual ones of the plurality of output ports output a signal that is delayed with respect to the input clock signal and also with respect to others of the plurality of output ports. The circuit further includes a logic network (20) having a first input for coupling to the input clock signal and a plurality of second inputs for coupling to the plurality of output ports. The logic network operates to logically combine signals emanating from the plurality of output ports with the input clock signal, and has an output port (OUTPUT) for outputting a signal having a frequency that is multiple of a frequency of the input clock signal. The signal that is output from the output port of the logic network has a 50% duty cycle regardless of the duty cycle of the input clock signal.

Marchand, U.S. Pat. No. 5,680,067 teaches a frequency dividing device having an input terminal for a signal to be divided and an output terminal for an output signal. It further comprises: a first mixing circuit which is particularly of the sub-harmonic type, has a first input which forms the input terminal, and a second input for receiving a signal from a local oscillator; a first dividing circuit for dividing the output signal of the first mixing circuit; a second dividing circuit for dividing the output signal of the local oscillator; and a second mixing circuit which has a first input for receiving the output signal of the first dividing circuit, and a second input for receiving the output signal of the second dividing circuit, and an output which forms the output terminal.

Hirata, U.S. Pat. No. 5,703,509 describes a frequency multiplier circuit that needs no coupling capacitors and no input bias circuits for a next-stage circuit, which includes a phase-shifted signal generator, first and second differential amplifiers, and a multiplier. The phase-shifted signal generator receives an initial input signal and generates first and second output signals whose phases are shifted by 90.degree. with each other. The first differential amplifier amplifies the first output signal to output a first positive-phase output signal and a first negative-phase output signal. The second differential amplifier amplifies the second output signal to output a second positive-phase output signal and a second negative-phase output signal. The multiplier multiplies the first and second positive-phase output signals to output a third positive-phase output signal as a positive-phase output of the frequency multiplier circuit. At the same time, it multiplies the first and second negative-phase output signals to output a third negative-phase output signal as a negative-phase output of the frequency multiplier circuit. Each of the third positive- and negative-phase output signals has a doubled frequency of the initial input signal and substantially the same dc offset voltage.

Simons et al, U.S. Pat. No. 5,914,620 describes a method and system of frequency multiplying a signal having amplitude modulation using a frequency multiplier operated at a bias voltage that is less than its saturation mode voltage is described. Prior to amplification, the amplitude modulated signal is pre-distorted to compensate for distortion caused by the frequency multiplier. A first pre-distortion phase converts the amplitude modulated signal into a corresponding square root signal to compensate for a first distortion type. A second pre-distortion phase pre-distorts the square root signal to compensate for the distortion caused by biasing the frequency multiplier at a voltage less than the saturation voltage of the multiplier. As a result, a signal that is amplitude modulated can be multiplied by a frequency multiplier.

Reichard et al, U.S. Pat. No. 5,999,618 teaches a telephone interface system for the transmission and reproduction of an audio performance, particularly a musical performance, at separate locations utilizing an amplitude modulated carrier frequency. The system serves to both transmit a performance at one instant location to one or more remote locations and to receive and reproduce a similar performance from the remote locations transmitted to the instant location. The performers at all locations hear the audio output of the performances at the other locations as though such other performers were actually present.

McClellan, (December, 1999) Test Equipment For Audio Technicians: Balanced-Line Converter, *Electronics Now*, pp. 41–44, describes a balanced Line Converter that offers a simple solution to the balanced line conversion problem. The unit accepts unbalanced inputs from consumer audio gear and has balanced outputs with impedances and levels that are suitable for professional audio equipment. The input impedance is 100,000 ohms-suitable for all solid state equipment and most vacuum tube gear. The latter is especially desirable if you use tube type microphone preamplifiers or signal processors. Such devices are currently popular in recording studios.

Szabo, (February 1993) Audio Level Controler, *Electronics Now*, pp. 41–44, describes a programmable audio-level controller to control the receiver's input and keep it in a comfortable zone.

Cypress Semiconductor Corporation, (Jan. 5, 2000), *Frequency Multiplier and Zero Delay Buffer*, San Jose, Calif., describes a two-output zero delay buffer and frequency multiplier. It provides an external feedback path allowing maximum flexibility when implementing the Zero Delay feature.

Burr-Brown Corration, (December 1995), *Wide Bandwidth Precision Analog Multiplier*, Tucson, Ariz., describes a wide bandwidth, high accuracy, four-quadrant analog multiplier. Its accurately laser trimmed multiplier characteristics make it easy to use in a wide variety of applications with a minimum of external parts, often eliminating all external trimming. Its differential X, Y, and Z inputs allow configuration as a multiplier, squarer, divider, square-rooter, and other functions while maintaining high accuracy.

Burr-Brown Corporation, (March 1995), *Multiplier-Divider*, Tucson, Ariz., describes a multiplier-divider having a low cost precision device designed for general purpose application. In addition to four-quadrant multiplication, it also performs analog square root and division without the bother of external amplifiers or potentiometers. Laser trimmed one-chip design offers the most in highly reliable operation with guaranteed accuracies. Because of the internal reference and pretrimmed accuracies the MPY1OO does not have the restrictions of other low cost multipliers. It is available in both TO-100 and DIP ceramic packages.

Burr-Brown Corporation, (August 1993), *Voltage-to-Frequency and Frequency-to Voltage Converter*, Tucson, Ariz., describes a monolithic voltage-to-frequency and frequency-to-voltage converter that provides a simple low cost method of converting analog signals into digital pulses. The digital output is an open collector and the digital pulse train repetition rate is proportional to the amplitude of the analog input voltage. Output pulses are compatible with TTL, and CMOS logic families.

Burr-Brown Corporation, (October 1993), *Wide Bandwidth Signal Multiplier*, Tucson, Ariz., describes a wide-bandwidth four-quadrant signal multiplier. Its output voltage is equal to the algebraic product of the X and Y input voltages. For signals up to 30 MHz, the on-board output op amp provides the complete multiplication function with a low-impedance voltage output. Differential current outputs extend multiplier bandwidth to 75 MHz.

The prior art teaches various apparatuses which convert analog signals to digital and the reverse, as well as allowing multiplexing over phone lines. The prior art also teaches a multiplexing system with increased bandwidth and dynamic range, where a transmission occurs over lightweight coaxial cable, or fiberoptic or twisted-pair cable. However, the prior art does not teach an invention and method that allows transmission of signals between local and remote musicians where the transmission occurs over standard phone lines with a bandwidth of up to 20 kHz, which is nearly seven times that enabled by prior art technology. The present invention fulfills these needs and provides further related advantages as described in the following summary.

SUMMARY OF THE INVENTION

The present invention teaches certain benefits in construction and use which give rise to the objectives described below. The present invention is an apparatus and method for joint music production from a remotely separated plurality of musicians joined by phone lines of a public telephone system. The public telephone system has a signal frequency cutoff limiting transmission to a low range which is incompatible with music. Each of the musicians produces a local music signal ($MS_L$) with full audio range. This signal is impressed on the public telephone system which creates a low-end outbound music signal ($LE_L$). Also, separately, the $MS_L$ signal is filtered through a first high-pass filter and mixed with a mixer signal to produce a sum/difference signal ($SD_L$). The $SD_L$ signal is impressed onto the second phone line of the public telephone system as a high-end outbound music signal ($HE_L$). A second mixer circuit receives at least one remotely produced sum/difference signal ($SD_R$) and the mixer signal and this is again filtered to obtain the high end signal only ($HE_R$). The $HE_R$ signal and the at least one remotely produced low-end signal ($LE_R$) are summed to produce the remotely originated limited band pass music signal ($MS_R$). $TMS_L$ and the $MS_R$ signals are summed for listening to the joint music production. Brotz et al, U.S. Pat. No. 5,398,278 teaches the use of conversion to digital form for multiplexing over a transmission line, while, Brotz et al, U.S. Pat. No. 5,020,101 describes a musician's telephone interface that interconnects an instant location through a telephone line to a remote location; such device having inputs to receive the sound from musical instruments and/or vocalization at each location with balancing circuitry and broadcast means at each location for the musicians at each location to hear the music of one another simultaneously balanced for collaboration and production of music. Reichard et al teaches transmission of an audio signal using an amplitude modulated carrier signal. The instant invention does not use modulation or multiplexing so that it clearly distinguishes over these references, and Reichard et al is not considered prior art in that its priority date is subsequent to the reduction to practice of the instant invention. It is also noted that a provisional application filed Dec. 30, 1998 set priority of the parent application to which this CIP is a continuation.

A primary objective of the present invention is to provide an apparatus and method for music production by at least two remotely located musicians having advantages not taught by the prior art.

Another objective is to provide such a apparatus and method of use, which is able to be utilized by musicians using conventional phone lines.

A further objective is to provide such an apparatus and method of use which allows a signal of up to 20 kHz bandwidth, which provides a band pass of nearly seven times that which is able to be conveyed over standard phone lines.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention wherein.

DETAILED DESCRIPTION OF THE INVENTION

The above described drawing figure illustrates the invention, an apparatus for music production by at least one local and at least one remotely located musician so that they can produce a jointly and combined music signal which seems to come from a common source although the local and remote musicians may be separated by a great distance.

Figure 1:
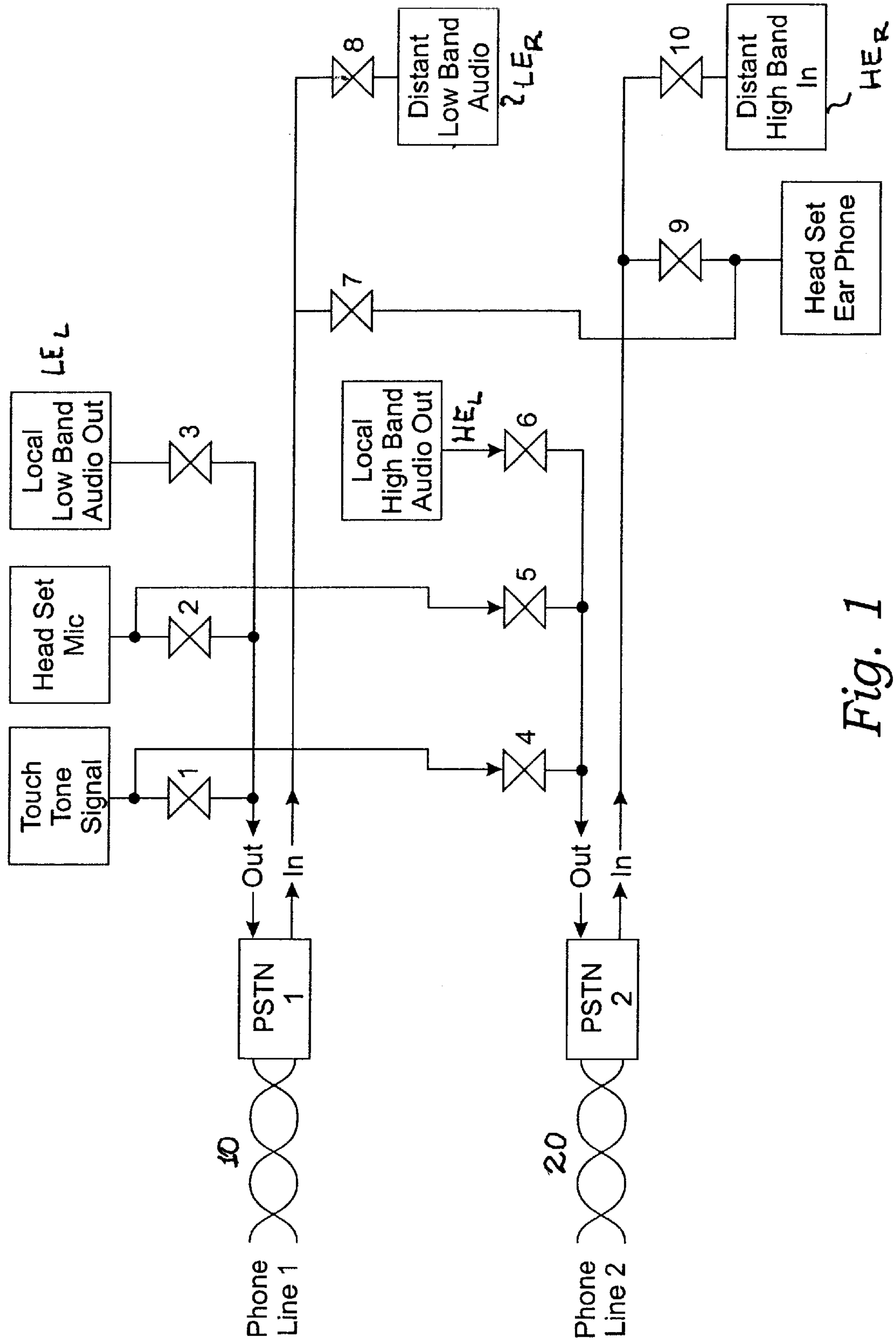
FIG. 1 is a schematic diagram of one of a plurality of local sites of the preferred embodiment of the present invention and showing interconnections for local low and high band audio output over two phone lines and receipt of low and high band input from a remote site. Nine gates numbered 1–9 are shown. These gates are analog gates switch controlled by a central computer switch circuit.
Figure 2:
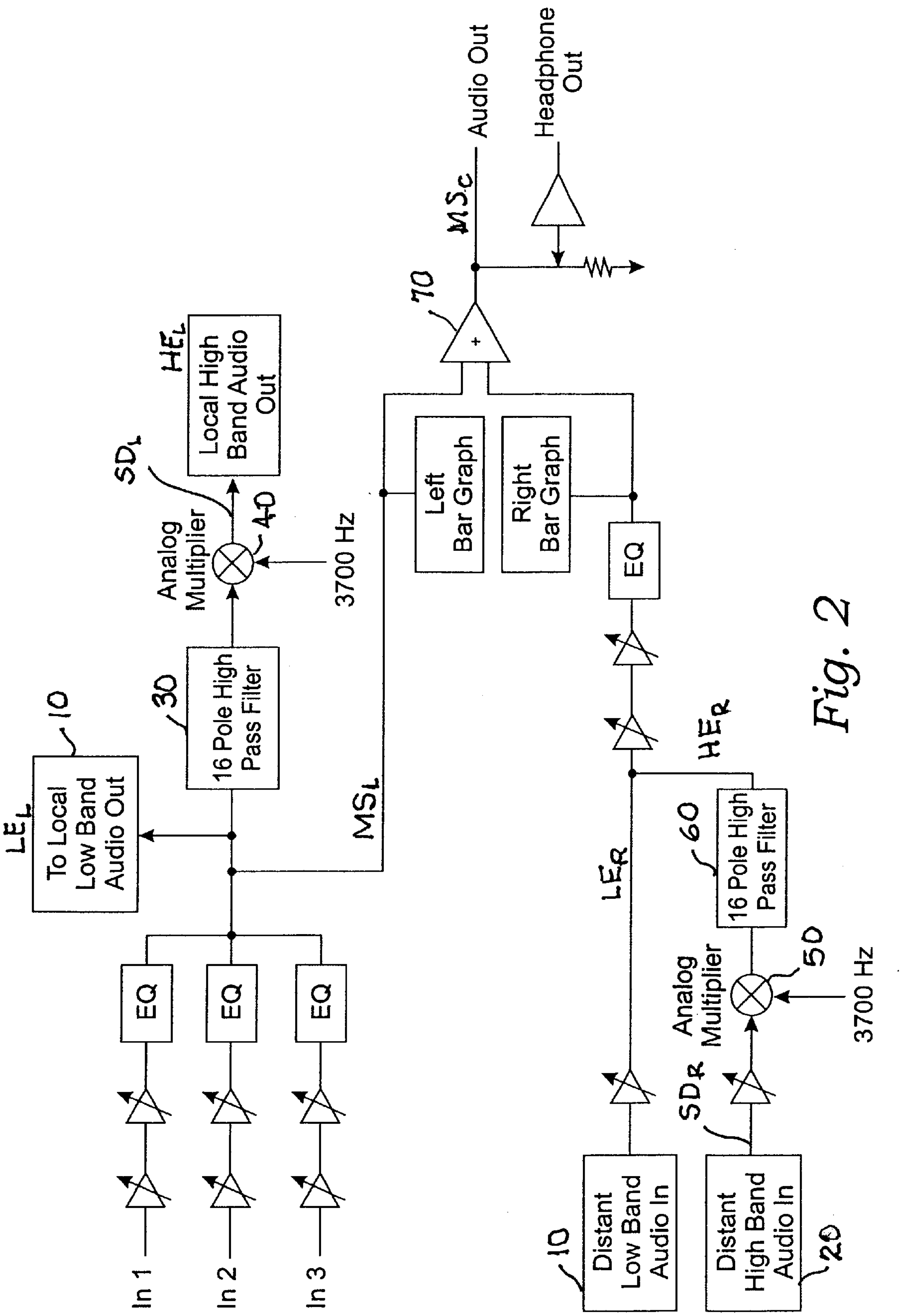
FIG. 2 is a schematic diagram showing local inputs 1–3 from local music sources processed to provide low and high band audio portion outputs to remote sites and also processing of low and high band from one or more remote sites combined to produce local audio output.

The present invention provides an apparatus, as defined in a preferred embodiment in the figures, for joint music production, comprising in combination: a remotely separated plurality of means for producing music wherein the figures illustrate any one of the music producing means and wherein the music may be generated by voice, instruments and other sources of music including storage devices such as compact disks and combinations of these. For instance a full orchestra or band might be separated by distance with each instrument at a different location. These sites or locations are interconnected by a first and a second phone lines of a public telephone system 10, 20. It is noted that the public telephone system has a signal frequency cutoff at about 3300 Hz or lower, thereby limiting transmission to a low range which is generally unsuited for music reproduction. Each of the remotely separated means for producing music generates a locally produced first music signal ($MS_L$) with full audio range, generally 50–20,000 Hz. In FIG. 1 this signal $MS_L$ is generated by three instruments or other local music sources designated by In 1, In 2 and In 3. Amplitude, balance and equalization controls are shown in this figure but are not a necessary part of the invention. This signal is generated by a microphone or equivalent device. The $MS_L$ signal is impressed on the first phone line 10 of the public telephone system to create a locally produced low-end outbound music signal ($LE_L$). This signal is low end because the effect of the copper wire phone company transmission line attenuates the high end frequencies leaving the low end mostly intact, although the phone lines also attenuates the lowest frequencies present in the signal to a more-or-less acceptable extent. The $MS_L$ signal is separately interconnected with a first high-pass filter 30; a first (analog) mixer circuit 40 receiving both the output of the first high-pass filter 30 as well as a mixer signal preferably of 3700 Hz. This produces a local sum/difference signal ($SD_L$) which is impressed onto the second phone line of the public telephone system as a high-end outbound music signal ($HE_L$). The sum components are attenuated in the phone line transmission, but the difference frequencies, which contain all of the information in the mid-range, i.e., from about 3300 to about 6600 Hz are preserved in the difference components which were translated to the 0–3300 Hz range by the analog multiplier 40.

Each of the remotely separated means for producing music further comprise a second similar mixer circuit 50 enabled for receiving a remotely produced sum/difference signal ($SD_R$) as well as the mixer signal of 3700 Hz. A second high-pass filter 60 receives the output of the second mixer circuit 50 which produces the sums of the transmitted frequencies with the mixer frequency, and is therefore enabled for reproducing the high-end of the remotely produced output signal ($HE_R$). Amplification, balancing and equalizing may be employed with respect to $HE_R$ as shown. A summing circuit 70 is interconnected for summing the $HE_R$ and $LE_R$ signals from the first 10 and second 20 phone lines of the public telephone system with the local signal $MS_L$ for producing a composite music signal $MS_C$. This composite signal is interconnected with a local output means, such as a speaker so as to enable listening to the joint music production.

It is noted that the $LE_L$ $HE_L$ $LE_R$ and $HE_R$ signals each have a frequency cutoff at approximately 3300 Hz.

In the preferred method of use of the above circuit, the steps of joining a remotely separated pair of means for producing music by a first and a second phone lines of a public telephone system is employed. The steps include producing the local first music signal ($MS_L$) with full audio range; impressing the $MS_L$ signal on the first phone line of the public telephone system to create a locally produced low-end outbound music signal ($LE_L$); filtering the $MS_L$ signal separately, with a first high-pass filter; mixing an output of the first high-pass filter with a mixer signal, thereby producing a locally produced sum/difference signal ($SD_L$); impressing the $SD_L$ signal onto the second phone line of the public telephone system as a high-end outbound music signal ($HE_L$); and further within both of the remotely separated means for producing music; enabling the second mixer circuit for receiving the remotely produced sum/difference signal ($SD_R$) and the mixer signal. The method further provides for receiving an output of the second mixer circuit at a second high-pass filter, thereby producing the high-end, remotely produced output signal ($HE_R$); joining the $HE_R$ signal and a remotely produced low-end signal ($LE_R$) from the first phone line of the public telephone system for producing a remotely originated limited band pass music signal; and summing the $MS_L$, $HE_R$ and $LE_R$ signals for listening to the joint music production.

Frequency multiplication is taught in the MacDonald, and frequency division is taught in the Usami and Marchand references incorporated herein. These techniques are very well known in the art and are employed for enablement in the present invention.

The technique or approach described above may be used to receive a range of remote music signals and to join them all with, or without, a local signal, to listen to a jam session taking place at one, or a plurality of remote locations.

The above technique is also applicable to multiple part signals, as with stereo, two part and surround-sound, where up to five or more signals parts may be required. Often, these signals are generated from a single mono-source synthetically, but actual multi-part signals obtained at the source of the original music is considered to be superior. The present invention may be easily adapted to there approaches by using more than two phone lines, i.e., four lines for a stereo transmission, etc. Also, the signals originating at a single site may be multiplexed to enable a single phone line to carry the traffic of plural remote music sources including mono, stereo and surround-sound transmissions. The $LE_R$ and $HE_R$ signals are treated in multiplex as independent signal components.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for joint music production comprising in combination: a remotely separated plurality of means for producing music interconnected by a first and a second phone lines of a public telephone system, wherein the public telephone system has a signal frequency cutoff limiting transmission to a low range; each of the remotely separated means for producing music providing a locally produced first music signal ($MS_L$) with full audio range, the $MS_L$ signal impressed on the first phone line of the public telephone system to create a locally produced low-end outbound music signal ($LE_L$); the $MS_L$ signal separately interconnected with a first high-pass filter; a first mixer circuit receiving an output of the first high-pass filter and a mixer signal, thereby producing a locally produced sum/difference signal ($SD_L$) impressed onto the second phone line of the public telephone system as a high-end outbound music signal ($HE_L$); each of the remotely separated means for producing music further comprising a second mixer circuit enabled for receiving a remotely produced sum/difference signal ($SD_R$) and the mixer signal, a second high-pass filter receiving an output of the second mixer circuit, and enabled for producing a high-end, remotely produced output signal ($HE_R$) therefrom; and a summing circuit interconnected for summing the $HE_R$ signal and a remotely produced low-end signal ($LE_R$) from the first phone line of the public telephone system with the $MS_L$ signal, and interconnected with a local output means for listening to the joint music production.

2. The apparatus of claim 1 wherein the mixer signal is 3700 Hz.

3. The apparatus of claim 1 wherein $MS_L$ has a frequency range of approximately 50–20,00 Hz.

4. The apparatus of claim 1 wherein the $LE_L$ $HE_L$ $LE_R$ and $HE_R$ signals each have a frequency cutoff at approximately 3300 Hz.

5. A method for joint music production comprising the steps of: joining a remotely separated pair of means for producing music by a first and a second phone lines of a public telephone system, wherein the public telephone system has a signal frequency cutoff limiting transmission to a low range; and within both of the remotely separated means for producing music: producing a locally produced first music signal ($MS_L$) with full audio range; impressing the $MS_L$ signal on the first phone line of the public telephone system to create a locally produced low-end outbound music signal ($LE_L$); filtering the $MS_L$ signal separately, with a first high-pass filter; mixing an output of the first high-pass filter with a mixer signal, thereby producing a locally produced sum/difference signal ($SD_L$); impressing the $SD_L$ signal onto the second phone line of the public telephone system as a high-end outbound music signal ($HE_L$); and further within both of the remotely separated means for producing music; enabling a second mixer circuit for receiving a remotely produced sum/difference signal ($SD_R$) and the mixer signal, receiving an output of the second mixer circuit at a second high-pass filter, thereby producing a high-end, remotely produced output signal ($HE_R$); summing the $HE_R$ signal and a remotely produced low-end signal ($LE_R$) from the first phone line of the public telephone system with the $MS_L$ signal for listening to the joint music production.

6. A method for joint music production comprising the steps of: joining a remotely separated plurality of means for producing music by at least a first and a second phone lines of a public telephone system, wherein the public telephone system has a signal frequency cutoff limiting transmission to a low range; and within each of the remotely separated means for producing music: producing a locally produced first music signal ($MS_L$) with full audio range; impressing the $MS_L$ signal on at least the first phone line of the public telephone system to create at least one locally produced low-end outbound music signal ($LE_L$); filtering the $MS_L$ signal separately, with a first high-pass filter; mixing an output of the first high-pass filter with a mixer signal, thereby producing a locally produced sum/difference signal ($SD_L$); impressing the $SD_L$ signal onto at least the second phone line of the public telephone system as a high-end outbound music signal ($HE_L$); and further within each of the remotely separated means for producing music; enabling a second mixer circuit for receiving at least one remotely produced sum/difference signal ($SD_R$) and the mixer signal, receiving an output of the second mixer circuit at a second high-pass filter, thereby producing a high-end, remotely produced output signal ($HE_R$); summing the $HE_R$ signal and at least one remotely produced low-end signal ($LE_R$) with the $MS_L$ signal for listening to the joint music production.

* * * * *